United States Patent
Spidell et al.

(10) Patent No.: US 12,430,022 B2
(45) Date of Patent: Sep. 30, 2025

(54) SYSTEM AND METHOD FOR MONITORING TOUCH EVENTS IN A COCKPIT DISPLAY

(71) Applicant: Rockwell Collins, Inc., Cedar Rapids, IA (US)

(72) Inventors: Clyde A Spidell, Cedar Rapids, IA (US); Tracy J. Barnidge, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 18 days.

(21) Appl. No.: 18/523,089

(22) Filed: Nov. 29, 2023

(65) Prior Publication Data

US 2025/0173058 A1    May 29, 2025

(51) Int. Cl.
*G06F 3/0488* (2022.01)
*G06F 3/01* (2006.01)
*G06F 3/041* (2006.01)

(52) U.S. Cl.
CPC ............ *G06F 3/0488* (2013.01); *G06F 3/013* (2013.01); *G06F 3/017* (2013.01); *G06F 3/0412* (2013.01)

(58) Field of Classification Search
CPC .. G06F 3/0416; G06F 3/04883; G06F 3/0436; G06F 3/04847; G06F 3/0433; G06F 2203/04806; G06F 3/0482
See application file for complete search history.

(56) References Cited

U.S. PATENT DOCUMENTS

| | | | |
|---|---|---|---|
| 8,378,798 B2 * | 2/2013 | Bells | G06F 3/016 340/407.1 |
| 9,423,871 B2 | 8/2016 | Sukumar | |
| 9,671,566 B2 * | 6/2017 | Abovitz | G06F 3/0482 |
| 9,829,995 B1 | 11/2017 | Reed et al. | |
| 10,162,478 B2 | 12/2018 | Chaudhri et al. | |
| 10,168,812 B1 | 1/2019 | Yates et al. | |

(Continued)

FOREIGN PATENT DOCUMENTS

| | | |
|---|---|---|
| EP | 3063602 B1 | 10/2019 |
| EP | 4180918 A1 | 5/2023 |

(Continued)

OTHER PUBLICATIONS

European Patent Office, Extended European Search Report received in EP Application No. 24215922.6, Mar. 20, 2025, 9 pages.

*Primary Examiner* — Shaheda A Abdin
(74) *Attorney, Agent, or Firm* — Suiter Swantz IP

(57) ABSTRACT

A system for monitoring touch events in a cockpit display includes one or more user monitoring devices including eye tracking sensors and body tracking sensors. The system includes a controller including a touch event algorithm configured to determine inadvertent touch events. The controller may receive eye gaze and body movement data of the user viewing the display. The controller may receive the spatial-temporal touch event data and compare the spatial-temporal touch event data with touch event signature data in a touch event signature database. The controller may determine whether the received user touch input is an inadvertent touch event. Upon determining the user touch input is an inadvertent touch, the controller may perform a first set of avionic system actions and upon determining the user touch input is an intentional touch, the controller may perform a second set of avionic system actions.

19 Claims, 6 Drawing Sheets

(56) References Cited

U.S. PATENT DOCUMENTS

| | | | |
|---|---|---|---|
| 10,572,007 B2 | 2/2020 | Agarwal et al. | |
| 2004/0061726 A1* | 4/2004 | Dunn | G06T 19/003 |
| | | | 715/855 |
| 2005/0243054 A1 | 11/2005 | Beymer et al. | |
| 2011/0175932 A1* | 7/2011 | Yu | G06F 3/04845 |
| | | | 345/661 |
| 2012/0194552 A1* | 8/2012 | Osterhout | G06F 1/163 |
| | | | 345/633 |
| 2013/0050133 A1 | 2/2013 | Brakensiek et al. | |
| 2013/0145304 A1 | 6/2013 | Deluca et al. | |
| 2014/0043241 A1* | 2/2014 | Sukumar | G06F 3/04186 |
| | | | 345/173 |
| 2014/0240242 A1* | 8/2014 | Kawalkar | G06F 3/0418 |
| | | | 345/173 |
| 2015/0016777 A1* | 1/2015 | Abovitz | G02B 27/0093 |
| | | | 385/37 |
| 2017/0090608 A1 | 3/2017 | Vieta et al. | |
| 2017/0364207 A1 | 12/2017 | Henderson et al. | |
| 2022/0397975 A1 | 12/2022 | Iliffe-Moon | |

FOREIGN PATENT DOCUMENTS

| | | |
|---|---|---|
| GB | 2528245 A | 1/2016 |
| IN | 201611033783 A | 4/2018 |

* cited by examiner

SYSTEM AND METHOD FOR MONITORING TOUCH EVENTS IN A COCKPIT DISPLAY

TECHNICAL FIELD

The subject matter disclosed herein relates to the field of flight displays and, in particular, to a system and method for monitoring touch events in flight displays.

BACKGROUND

Flight displays often utilize touchscreens across all segments of aviation. The sensing algorithms of the touchscreens may incorrectly register a touch point for multiple reasons. The impact of inadvertent touch may result in an extended task time and/or may result in an unintended input that may impact more critical aircraft system setting(s), configuration(s), and/or control(s). As such, there is a need for a system and method to reduce the likelihood of inadvertent touch events and decrease the possibility of inadvertent touch events from occurring.

SUMMARY

A system for monitoring touch events in a cockpit display is disclosed, in accordance with one or more embodiments of the present disclosure. In embodiments, the system includes one or more user interface devices including a display and a user input device, where the user input device includes a touchscreen interface configured to receive a user touch input. In embodiments, the display includes one or more display touch sensors configured to detect spatial-temporal touch event data associated with the user touch input. In embodiments, the system includes one or more user monitoring devices including one or more eye tracking sensors configured to detect an eye gaze of a user viewing the display and one or more body tracking sensors configured to detect body movement of the user viewing the display. In embodiments, the system includes one or more controllers communicatively coupled to the one or more user monitoring devices and the one or more user interface devices. In embodiments, the one or more controllers include one or more processors configured to execute a set of program instructions stored in memory. In embodiments, the memory includes a touch event algorithm configured to detect inadvertent touch events. In embodiments, the set of program instructions configured to cause the one or more processors to receive eye gaze data of the user viewing the display from the one or more eye tracking sensors. In embodiments, the set of program instructions configured to cause the one or more processors to receive body movement data of the user viewing the display from the one or more body tracking sensors. In embodiments, the set of program instructions configured to cause the one or more processors to receive the spatial-temporal touch event data of the user viewing the display from the one or more display touch sensors. In embodiments, the set of program instructions configured to cause the one or more processors to compare the spatial-temporal touch event data with touch event signature data in a touch event signature database. In embodiments, the set of program instructions configured to cause the one or more processors to determine whether the received user touch input is an inadvertent touch event based on the compared spatial-temporal touch event data and at least one of the eye gaze data or the body movement data. In embodiments, upon determining the received user touch input is an inadvertent touch, the set of program instructions are configured to cause the one or more processors to perform a first set of one or more avionic system actions. In embodiments, upon determining the received user touch input is an intentional touch, the set of program instructions are configured to cause the one or more processors to perform a second set of one or more avionic system actions, wherein the second set of one or more avionic system actions are different than the first set of one or more avionic system actions.

In some embodiments, the first set of one or more avionic system actions may include ignoring the user touch input by not providing the received user touch input to an avionics system.

In some embodiments, the first set of one or more avionic system actions may include generating one or more control signals configured to cause the display to display an on-screen pop-up, wherein the on-screen pop-up allows the user to confirm whether the user touch input is an inadvertent touch.

In some embodiments, the second set of one or more avionic system actions may include providing the received user touch input to one or more avionic systems.

In some embodiments, the set of program instructions may be further configured to cause the one or more processors to adjust one or more selectable buttons on a graphical user interface of the display.

In some embodiments, upon determining the received user touch input is an inadvertent touch, decrease a size of the one or more selectable buttons on the graphical user interface of the display.

In some embodiments, upon determining the received user touch input is an inadvertent touch, decrease a brightness of the one or more selectable buttons on the graphical user interface of the display.

In some embodiments, upon determining the received user touch input is an inadvertent touch, hide the one or more selectable buttons on the graphical user interface of the display.

In some embodiments, upon determining the received user touch input is an intentional touch, increase a size of the one or more selectable buttons on the graphical user interface of the display.

In some embodiments, upon determining the received user touch input is an intentional touch, increase a brightness of the one or more selectable buttons on the graphical user interface of the display.

In some embodiments, the one or more eye tracking sensors may include one or more eye tracking cameras.

In some embodiments, the one or more body tracking sensors may include one or more body tracking cameras.

In some embodiments, the one or more eye tracking sensors and the one or more body tracking sensors may be integrated into a common interface.

In some embodiments, the one or more eye tracking sensors and the one or more body tracking sensors may be separated.

A method for monitoring touch events in a cockpit display is disclosed, in accordance with one or more embodiments of the present disclosure. In embodiments, the method includes receiving one or more inputs from a user via a touchscreen interface of one or more user interface devices, where the one or more user interface devices include a display. In embodiments, the method includes detecting an eye gaze of the user viewing the display using one or more eye tracking sensors. In embodiments, the method includes detecting body movement of the user viewing the display using one or more body tracking sensors. In embodiments, the method includes receiving spatial-temporal touch event data of the user viewing the display from one or more display touch sensors. In embodiments, the method includes comparing the spatial-temporal touch event data with touch event signature data in a touch event signature database. In embodiments, the method includes determining whether the received user touch input is an inadvertent touch event based on the compared spatial-temporal touch event data and at least one of detected eye gaze data from the one or more eye tracking sensors or detected body movement data from the one or more body tracking sensors. In embodiments, upon determining the received user touch input is an inadvertent touch, the method includes performing a first set of one or more avionic system actions. In embodiments, upon determining the received user touch input is an intentional touch, the method includes performing a second set of one or more avionic system actions, wherein the second set of one or more avionic system actions are different than the first set of one or more avionic system actions.

In some embodiments, the first set of one or more avionic system actions may include ignoring the user touch input by not providing the received user touch input to an avionics system.

In some embodiments, the first set of one or more avionic system actions may include generating one or more control signals configured to cause the display to display an on-screen pop-up, wherein the on-screen pop-up allows the user to confirm whether the user touch input is an inadvertent touch.

In some embodiments, the first set of one or more avionic system actions may include providing the received user touch input to one or more avionic systems.

In some embodiments, the method may further include adjusting one or more selectable buttons on a graphical user interface of the display.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Figure 1A:
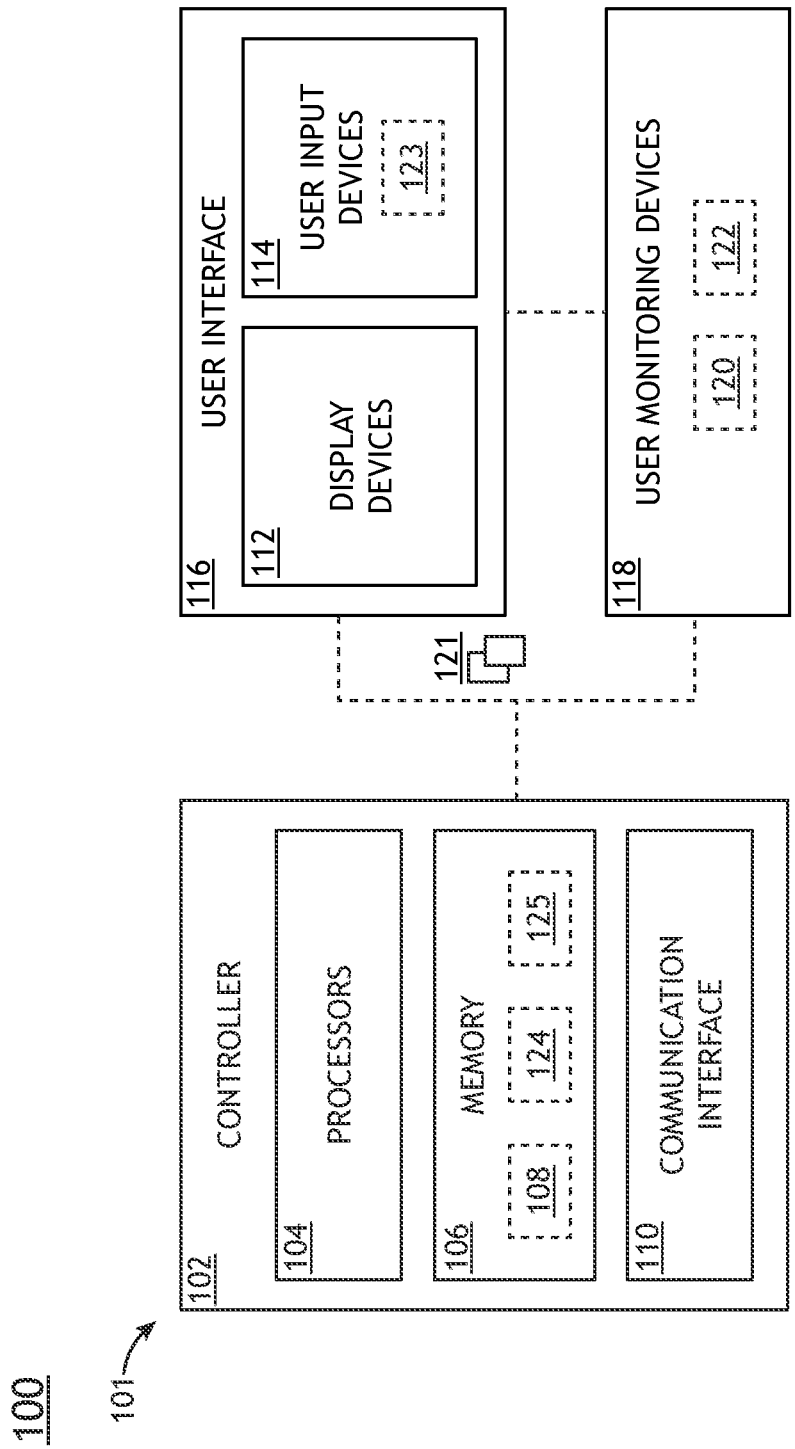
FIG. 1A illustrates a simplified block diagram of an aircraft including a system for monitoring touch events in a cockpit display, in accordance with one or more embodiments of the disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

Flight displays often utilize touchscreens across all segments of aviation. The sensing algorithms of the touchscreens may incorrectly register a touch point for multiple reasons. The occurrence of such inadvertent touch is important in a cockpit environment. For example, the impact of inadvertent touch may result in an extended task time and/or may result in an unintended input that may impact more critical aircraft system setting(s), configuration(s), and/or control(s) (e.g., incorrect selection of a waypoint or value, unintended toggle of a soft switch, or the like). There is therefore a need for a system and method to reduce the likelihood of inadvertent touch events and decrease the possibility of inadvertent touch events from occurring.

As such, it would be desirable to provide a system and method for monitoring touch events in a cockpit display that cure one or more of the shortfalls of the previous approaches discussed above. The system and method should track a viewer's eye gaze. In some embodiments, the system and method may track body movements (e.g., hand movements, or the like). The system and method provide a valid touch event confidence state level (e.g., high probability, medium probability, or low probability). For example, based on the confidence state level of the touch event, the system and method may perform one or more predetermined actions. For instance, where a low confidence state level is determined, the detected event(s) may be ignored. In another instance, where a high confidence state level is determined, the detected event(s) may be executed. The system and method should help to declutter keyable touch input graphics. For example, the keyable input graphics may be subdued, scaled down, or hidden from the display screen when no intent for touch is detected.

It is contemplated that interaction with a touch display requires direct and intentional viewing of the target immediately prior to touch selection, as well as a coordinated movement of the viewer's arm/hand. A given cockpit layout is highly engineered and provides a controlled environment with flight displays being placed at exacting locations with fixed sizes and orientations to each crew position. In this regard, the tracking of a viewer's eye gaze (and/or body movements) is enabled to allow the system and method to utilize the tracked eye gaze (and/or body movements) to validate a touch event before communicating it to the aircraft system to thus, decrease the occurrence of inadvertent touch events.

Figure 1B:
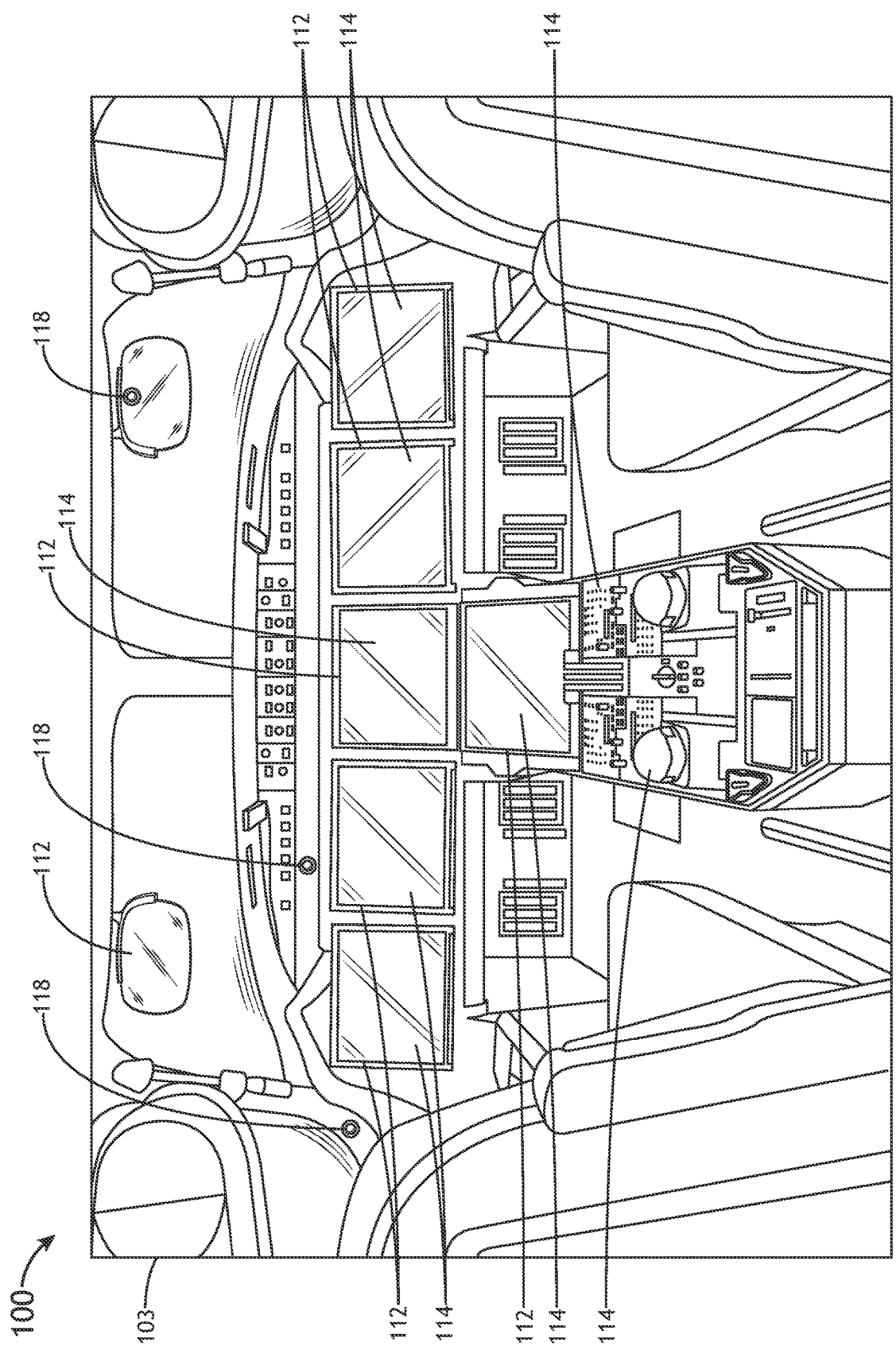
FIG. 1B illustrates a simplified schematic of an aircraft cockpit including the system for monitoring touch events in a cockpit display, in accordance with one or more embodiments of the disclosure.

FIG. 1A illustrates a simplified block diagram of an aircraft 100 including a system 101 for monitoring touch events in a cockpit display, in accordance with one or more embodiments of the present disclosure. FIG. 1B illustrates a simplified schematic of an aircraft cockpit 103 including the system 101 for monitoring touch events in a cockpit display, in accordance with one or more embodiments of the disclosure.

Referring now to FIG. 1A, the aircraft 100 may include an aircraft controller 102. The aircraft controller 102 may include one or more processors 104, memory 106 configured to store one or more program instructions, and/or one or more communication interfaces 110.

The aircraft 100 may include an avionics environment such as, but not limited to, a cockpit 103. The aircraft controller 102 may be coupled (e.g., physically, electrically, and/or communicatively) to one or more display devices 112. Referring now to FIG. 1B, the avionics environment (e.g., the cockpit 103) may include any number of display devices 112 (e.g., one, two, three, or more displays) such as, but not limited to, one or more head-down displays (HDDs) 112, one or more head-up displays (HUDs) 112, one or more multi-function displays (MFDs), one or more adaptive flight displays (AFDs) 112, one or more primary flight displays (PFDs) 112, one or more electronic flight bags (EFBs) 112, or the like.

The aircraft controller 102 may be coupled (e.g., physically, electrically, and/or communicatively) to one or more user input devices 114. The one or more display devices 112 may be coupled to the one or more user input devices 114. For example, the one or more display devices 112 may be coupled to the one or more user input devices by a transmission medium that may include wireline and/or wireless portions. The one or more display devices 112 may include and/or be configured to interact with one or more user input devices 114.

The one or more user input devices 114 may include a touchscreen interface. For example, the display device 112 may be integrated with a touchscreen interface 114, such as, but not limited to, a capacitive touchscreen, a resistive touchscreen, a surface acoustic based touchscreen, an infrared based touchscreen, or the like. In a general sense, any touchscreen interface capable of integration with the display portion of a display device is suitable for implementation in the present invention.

The one or more input devices 114 may further include, but are not limited to, a keyboard, a keypad, a lever, a knob, a scroll wheel, a track ball, a switch, a dial, a sliding bar, a scroll bar, a slide, a handle, a touch pad, a paddle, a steering wheel, a joystick, a bezel input device, or the like.

The display devices 112 may include, but are not limited to, a liquid crystal display (LCD), a light-emitting diode (LED) based display, an organic light-emitting diode (OLED) based display, an electroluminescent display (ELD), an electronic paper (E-ink) display, a plasma display panel (PDP), a display light processing (DLP) display, a micro-LED display, a quantum dot electroluminescent (QD-EL) display, or the like. Those skilled in the art should recognize that a variety of display devices may be suitable for implementation in the present invention and the particular choice of display device may depend on a variety of factors, including, but not limited to, form factor, cost, and the like. In a general sense, any display device capable of integration with the user input device (e.g., touchscreen, bezel mounted interface, keyboard, mouse, and the like) is suitable for implementation in the present invention.

The one or more display devices 112 and the one or more user input devices 114 may be standalone components within the aircraft 100. It is noted herein, however, that the one or more display devices 112 and the one or more user input devices may be integrated within one or more common user interfaces 116. Where the one or more display devices 112 and the one or more user input devices 114 are housed within the one or more common user interfaces 116, the aircraft controller 102 and/or the one or more common user interfaces may be standalone components. It is noted herein, however, that the aircraft controller 102 and/or the one or more common user interfaces 116 may be integrated within one or more common housings or chassis.

The display 112 may be configured to display an avionics graphical user interface (GUI) including one or more keyable icons. For example, the one or more keyable icons may be selected via the touchscreen interface of the user input device 114. As previously discussed herein, inadvertent selection of one of the one or more keyable icons may result in an unintended input that may impact more critical aircraft system setting(s), configuration(s), and/or control(s).

The system 101 may include one or more user monitoring devices 118. The one or more user monitoring devices 118 may be communicatively coupled to the aircraft controller 102. For example, the one or more user monitoring devices 118 may be configured to monitor a user for one or more touch event parameters. In one instance, the one or more user monitoring devices 118 may be configured to monitor a crew member's (e.g., pilot, co-pilot, or the like) eye gaze (or fixation). In another instance, the one or more user monitoring devices 118 may be configured to monitor a crew member's (e.g., pilot, co-pilot, or the like) body movement (e.g., arms, hands, shoulders, or the like). In another instance, the one or more user monitoring devices 118 may be configured to monitor a crew member's (e.g., pilot, co-pilot, or the like) body posture.

The user monitoring device 118 may include one or more eye tracking sensors 120 configured to detect a current gaze of a user viewing the display 112. For example, the one or more eye tracking sensors 120 may include one or more eye tracking cameras 120 coupled to one or more portions of a cockpit (such as the cockpit 103 shown in FIG. 1B), where the one or more eye tracking cameras 120 are configured to generate at least one of one or more images 121 or one or more videos 121 including the user's eye gaze. In one instance, the one or more eye tracking cameras 120 may include at least one camera 120 mounted straight facing (e.g., in front of) the pilot. In another instance, the one or more eye tracking cameras 120 may include at least one camera 120 mounted to the left and/or right of the pilot. In another instance, the one or more eye tracking cameras 120 may include at least one camera 120 mounted above the pilot (e.g., facing downward). It is noted that the camera 120 may be mounted in any suitable location within the cockpit to accurately capture one or more images and/or videos 121 of the eye gaze of the pilot.

By way of another example, the one or more eye tracking sensors 120 may include one or more structured light emitters along with one or more image sensors with digital processing algorithms configured to track at least one of head, hand, and/or eye positions.

The user monitoring device 118 may include one or more body movement tracking sensors 122 configured to detect body movement of a user using the display 112. For example, the one or more body movement tracking sensors 122 may include one or more body movement tracking cameras 122 coupled to one or more portions of a cockpit (such as the cockpit 103 shown in FIG. 1B), where the one or more body movement tracking cameras 122 are configured to generate at least one of one or more images 121 or one or more videos 121 including the user's body movement (e.g., movement of the arms, head, shoulders, or the like). In one instance, the one or more body movement tracking cameras 122 may include at least one camera 122 mounted straight facing (e.g., in front of) the pilot. In another instance, the one or more body movement tracking cameras 122 may include at least one camera 122 mounted to the left and/or right of the pilot. In another instance, the one or more body movement tracking cameras 122 may include at least one camera 122 mounted above the pilot (e.g., facing downward). It is noted that the camera 122 may be mounted in any suitable location within the cockpit to accurately capture one or more images and/or videos 121 of a user's body movement (e.g., movement of the arms, head, shoulders, or the like).

By way of another example, the one or more body movement tracking sensors 122 may include, but are not limited to, one or more thermal sensors (e.g., thermal imaging cameras), one or more visible cameras (e.g., LIDAR cameras), one or more radar devices, one or more time of flight sensors, one or more body worn sensors (e.g., on arms, wrist, hand(s), head, or the like).

Although FIG. 1A depicts the eye tracking sensors 120 and the body movement tracking sensor 122 as separate components, it is contemplated herein that eye tracking sensor 120 and the body movement tracking sensor 122 may be a single sensor configured to detect both eye gaze and body movement. Rather, FIGS. 1A-1B are provided merely for illustrative purposes and shall not be construed as limiting the scope of the present disclosure.

The system 101 may include one or more display touch sensors 123. For example, the touchscreen interface of the user input device 114 may include one or more display touch sensors 123. The one or more display touch sensors 123 may be configured to detect user interaction with the touchscreen interface of the user input device 114. For example, the one or more display touch sensors 123 may be configured to detect touch events between the user and the touchscreen interface of the user input device 114.

The system 101 may include a touch event signature database 125. For example, the aircraft controller 102 may include the touch event signature database 125 stored in memory 106. By way of another example, the touch event signature database 125 may be stored in a remote database and be communicatively coupled to the aircraft controller 102. The touch event signature database 125 may include one or more valid touch event signatures that indicate an intentional touch event has occurred. In this regard, a comparison between the detected touch event from the display touch sensor 123 and the touch event signatures of the database 125 may be used to determine whether the touch was intentional (e.g., valid) or inadvertent (e.g., invalid).

The aircraft controller 102 may include a touch event algorithm 124 stored in memory 106. For example, the one or more processors 104 may be configured to validate a touch event between the pilot and the touchscreen interface 114 using the touch event algorithm 124. For instance, as discussed further herein, the touch event algorithm 124 of the one or more processors 104 may be configured to validate one or more touch events based on at least one of the user's eye gaze from the eye gaze sensors 120, the user's body movement from the body movement sensors 122, or the display touch data from the display touch sensors 123. By way of another example, the one or more processors 104 may be configured to perform one or more actions based on touch event validation data from the touch event algorithm 124. In one instance, the one or more processors 104 may ignore the detected touch event when the touch event algorithm 124 identifies an inadvertent touch, as discussed further herein. In another instance, the one or more processors 104 may request an on-screen confirmation of detected touch event when the touch event algorithm 124 identifies a possible inadvertent touch, as discussed further herein. In another instance, the one or more processors 104 may execute the detected touch event when the touch event algorithm 124 identifies a valid touch, as discussed further herein. By way of another example, the one or more processors 104 may be configured to adjust the display 112 based on touch event validation data from the touch event algorithm 124. In one instance, the one or more processors 104 may decrease a size of the GUI (or one or more selectable icons of the GUI) when the touch event algorithm 124 identifies an inadvertent touch (or possible inadvertent touch), as discussed further herein. In another instance, the one or more processors 104 may decrease a transparency of the GUI (or one or more selectable icons of the GUI) when the touch event algorithm 124 identifies an inadvertent touch (or possible inadvertent touch), as discussed further herein. In another instance, the one or more processors 104 may hide the GUI (or one or more selectable icons of the GUI)

when the touch event algorithm 124 identifies an inadvertent/invalid touch (or possible inadvertent touch), as discussed further herein. In another instance, the one or more processors 104 may increase a size of the GUI (or one or more selectable icons of the GUI) when the touch event algorithm 124 identifies a valid/intentional touch, as discussed further herein. In another instance, the one or more processors 104 may sharpen the appearance of the GUI (or one or more selectable icons of the GUI) when the touch event algorithm 124 identifies a valid/intentional touch, as discussed further herein.

Figure 2A:
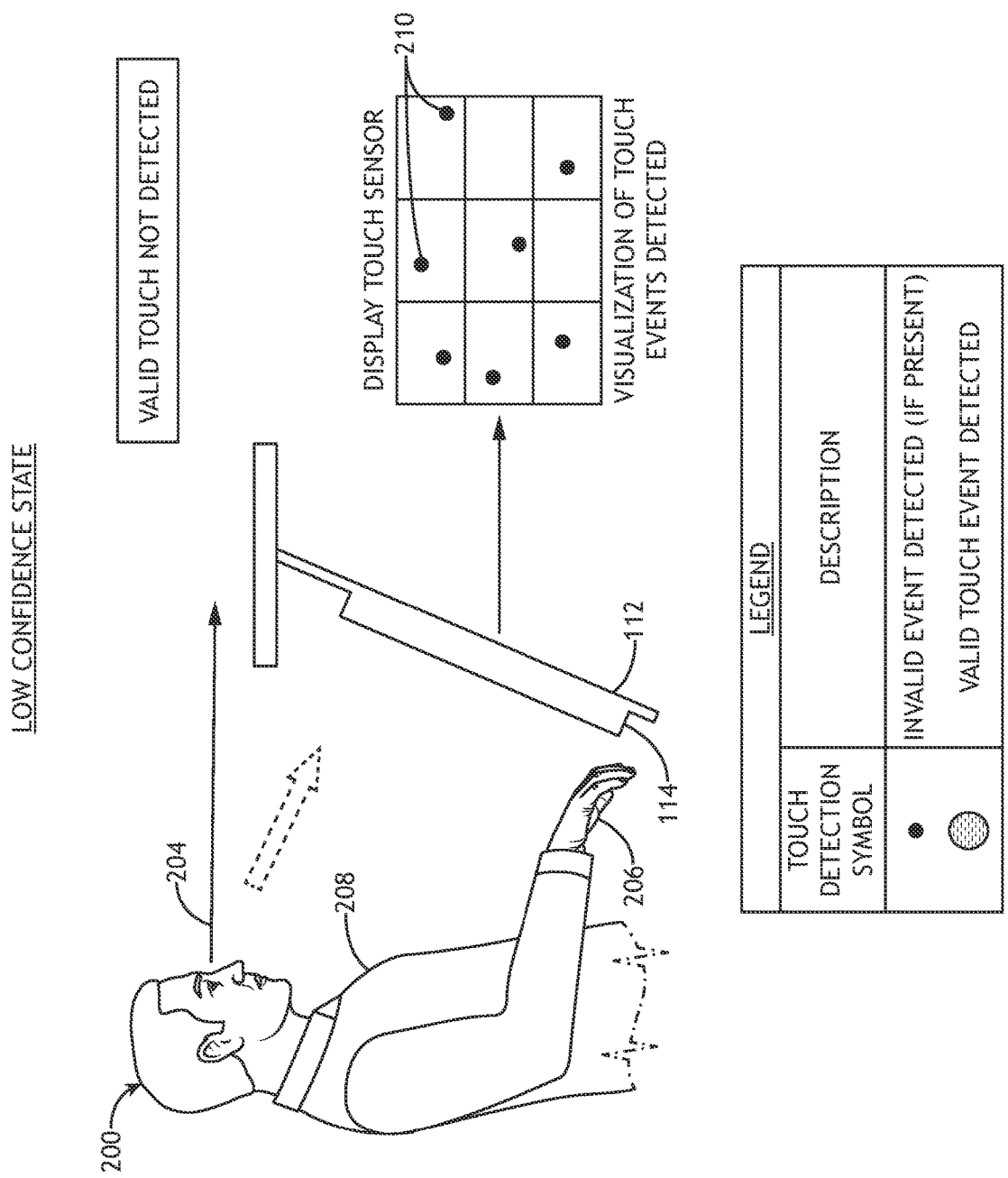
FIG. 2A illustrates a low confidence state of the system for monitoring touch events in a cockpit display, in accordance with one or more embodiments of the disclosure.
Figure 2B:
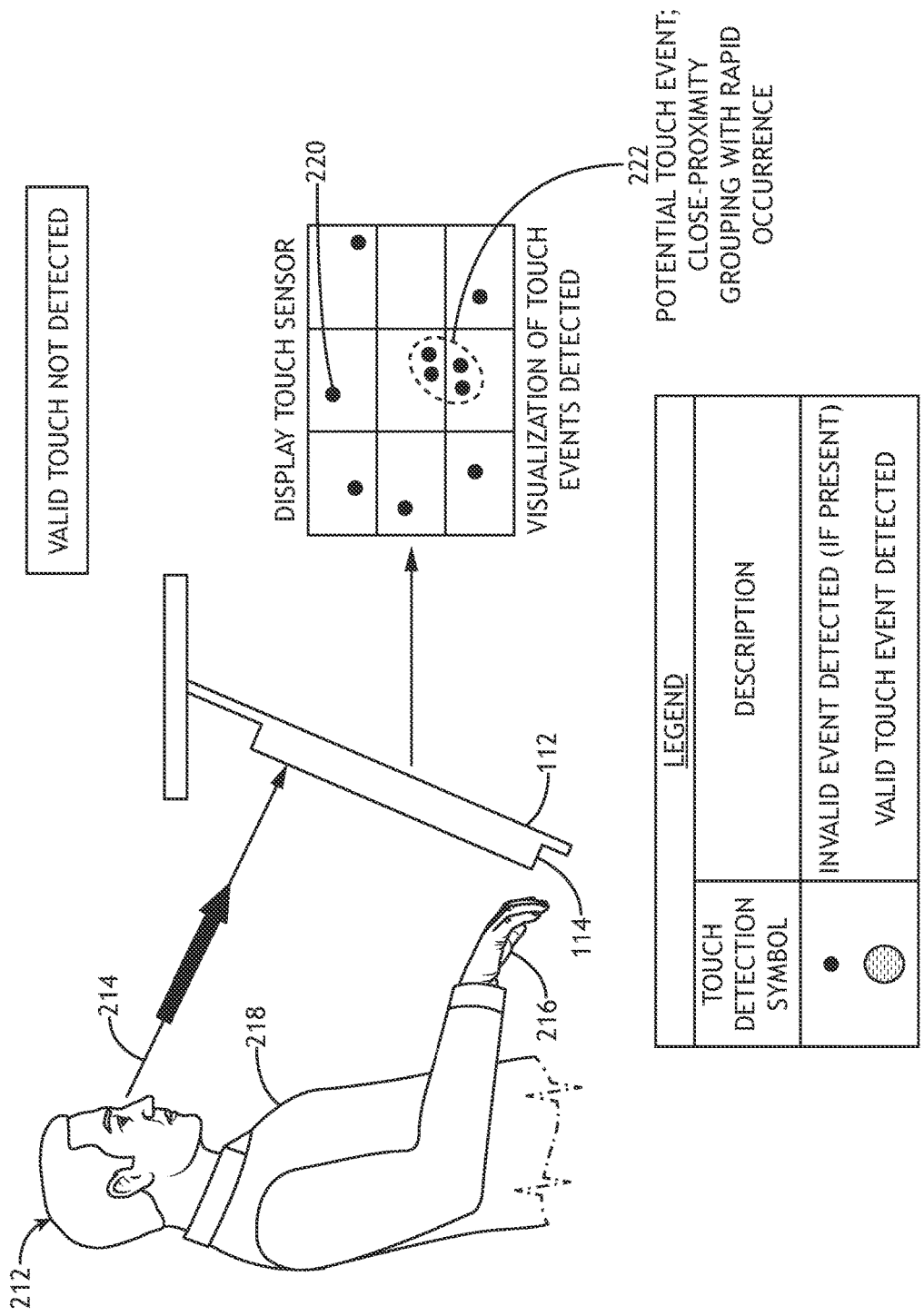
FIG. 2B illustrates a medium confidence state of the system for monitoring touch events in a cockpit display, in accordance with one or more embodiments of the disclosure.
Figure 2C:
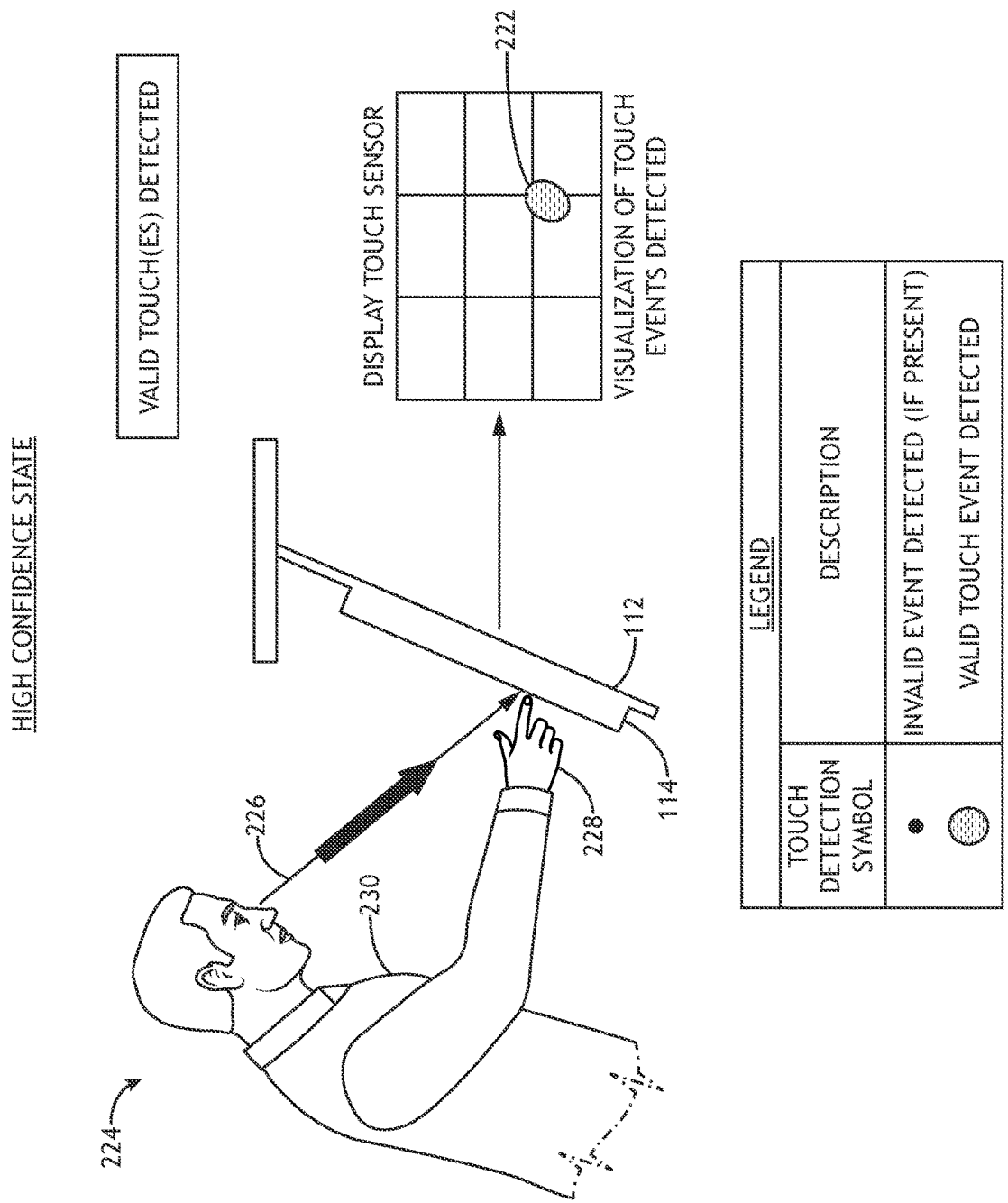
FIG. 2C illustrates a high confidence state of the system for monitoring touch events in a cockpit display, in accordance with one or more embodiments of the disclosure.

Referring now to FIGS. 2A-2C, one or more confidence states of the touch event validation of the touch event algorithm 124 of the system 101 are shown. For example, FIG. 2A illustrates a low confidence state of the system for monitoring touch events in a cockpit display, in accordance with one or more embodiments of the disclosure. FIG. 2B illustrates a medium confidence state of the system for monitoring touch events in a cockpit display, in accordance with one or more embodiments of the disclosure. FIG. 2C illustrates a high confidence state of the system for monitoring touch events in a cockpit display, in accordance with one or more embodiments of the disclosure.

As previously mentioned herein, it is contemplated that interaction with a touch display requires direct and intentional viewing of the target immediately prior to touch selection. A given cockpit layout is highly engineered and provides a controlled environment with flight displays being placed at exacting locations with fixed sizes and orientations to each crew position. In this regard, the system 101 is able to monitor the one or more touch event parameters to validate a touch event before communicating it to the aircraft system and decrease the occurrence of inadvertent touch events.

The system 101 may be configured to identify two or more inadvertent touch events based on at least one of the user's eye gaze from the eye gaze sensors 120, the user's body movement from the body movement sensors 122, or the display touch data from the display touch sensors 123. For example, in a non-limiting example, two or more inadvertent touch events may be identified where the eye gaze sensors 120 detect that the user's eye gaze is not directed towards the display 112. By way of another non-limiting example, two or more inadvertent touch events may be identified where the body movement sensors 122 detect that that user's body position does not match the criteria for a touch event. In one instance, a user's body position may not match the criteria for a touch event when the user's arm is not extended towards the display 112. In another instance, a user's body position may not match the criteria for a touch event when the user's body is turned away from the display 112 (e.g., a user's head may be tilted down in the direction of displays). By way of another non-limiting example, two or more inadvertent touch events may be identified where the display sensors 123 identify no matches between the detected touch event(s) and touch event signatures stored in the touch event signature database 125.

The system 101 may be configured to assign a confidence state level, using the touch event algorithm 124, based on the touch event data. It is contemplated herein that reference to "low", "medium", and "high" confidence states is merely for illustrative purposes and shall not be construed as limiting the scope of the present disclosure. For example, the confidence states may be referred to as a first confidence state, a second confidence state, a third confidence state, or the like.

Referring to FIG. 2A, a low confidence state is shown. For purposes of the present disclosure, the term "low confidence state" may be defined as a state where no valid touch event is detected (e.g., only inadvertent touch events are detected), in accordance with one or more embodiments of the present disclosure.

For example, in a non-limiting example, a user's 200 eye gaze 204 may not be directed towards the display 112, the user's 200 arms/hands 206 may not be extended towards the display 112, and the user's 200 body 208 may not be directed towards the display. Further, the display touch sensors 123 may detect sporadic touch events 210 (e.g., touch events spaced sporadically throughout the display), where the sporadic touch events 210 do not match any of the touch event signatures stored in the database 125.

When a low confidence state is detected, one or more processors 104 may be configured to perform one or more actions based on touch event validation data from the touch event algorithm 124. In one non-limiting example, the one or more processors 104 may ignore the detected touch event when the touch event algorithm 124 identifies an inadvertent touch.

When a low confidence is detected, the one or more processors 104 may be further configured to adjust the display 112 based on touch event validation data from the touch event algorithm 124. In one instance, the one or more processors 104 may decrease a size of the GUI (or one or more selectable icons of the GUI) when the touch event algorithm 124 identifies an inadvertent touch. In another instance, the one or more processors 104 may decrease a transparency of the GUI (or one or more selectable icons of the GUI) when the touch event algorithm 124 identifies an inadvertent touch. In another instance, the one or more processors 104 may hide the GUI (or one or more selectable icons of the GUI) when the touch event algorithm 124 identifies an inadvertent/invalid touch.

Referring to FIG. 2B, a medium confidence state is shown. For purposes of the present disclosure, the term "medium confidence state" may be defined as a state where possible valid touch event(s) is/are detected, in accordance with one or more embodiments of the present disclosure.

For example, in a non-limiting example, a user's 212 eye gaze 214 may be directed towards the display 112, the user's 212 arms/hands 216 may not be extended towards the display 112, and the user's 212 body 218 may be directed towards the display. Further, the display touch sensors 123 may detect sporadic touch events 220 (e.g., touch events spaced sporadically throughout the display), where the sporadic touch events 220 do not match any of the touch event signatures stored in the database 125 and a grouping 222 of touch events. In this regard, some of the touch event parameters indicate that a valid/intentional touch event occurred (e.g., eye gaze toward display, body towards display, and grouping of touch events 222), while some of the touch event parameters indicate that an inadvertent/invalid touch event occurred (e.g., sporadic touch events 220 and arms/hands not extended towards display 112).

When a medium confidence state is detected, one or more processors 104 may be configured to perform one or more actions based on touch event validation data from the touch event algorithm 124. In one non-limiting example, the one or more processors 104 may ignore the detected touch event when the touch event algorithm 124 identifies a possible inadvertent touch. In another non-limiting example, the one or more processors 104 may request an on-screen confirmation of detected touch event when the touch event algorithm 124 identifies a possible inadvertent touch.

When a medium confidence state is detected, the one or more processors 104 may be further configured to adjust the display 112 based on touch event validation data from the touch event algorithm 124. In one instance, the one or more processors 104 may decrease a size of the GUI (or one or more selectable icons of the GUI) when the touch event algorithm 124 identifies a possible inadvertent touch. In another instance, the one or more processors 104 may decrease a transparency of the GUI (or one or more selectable icons of the GUI) when the touch event algorithm 124 identifies a possible inadvertent touch. In another instance, the one or more processors 104 may hide the GUI (or one or more selectable icons of the GUI) when the touch event algorithm 124 identifies a possible inadvertent touch.

Referring to FIG. 2C, a high confidence state is shown. For purposes of the present disclosure, the term "high confidence state" may be defined as a state where valid touch event(s) is/are detected, in accordance with one or more embodiments of the present disclosure.

For example, in a non-limiting example, a user's 224 eye gaze 226 may be directed towards the display 112, the user's 224 arms/hands 228 may be extended towards the display 112, and the user's 224 body 230 may be directed towards the display. Further, the display touch sensors 123 may detect a blob 232 that matches a touch event signature stored in the database 125.

When a high confidence state is detected, the one or more processors 104 may execute the detected touch event when the touch event algorithm 124 identifies a valid touch.

When a high confidence state is detected, the one or more processors 104 may be further configured to adjust the display 112 based on touch event validation data from the touch event algorithm 124. In one instance, the one or more processors 104 may increase a size of the GUI (or one or more selectable icons of the GUI) when the touch event algorithm 124 identifies a valid/intentional touch. In another instance, the one or more processors 104 may sharpen the appearance of the GUI (or one or more selectable icons of the GUI) when the touch event algorithm 124 identifies a valid/intentional touch.

Figure 3:
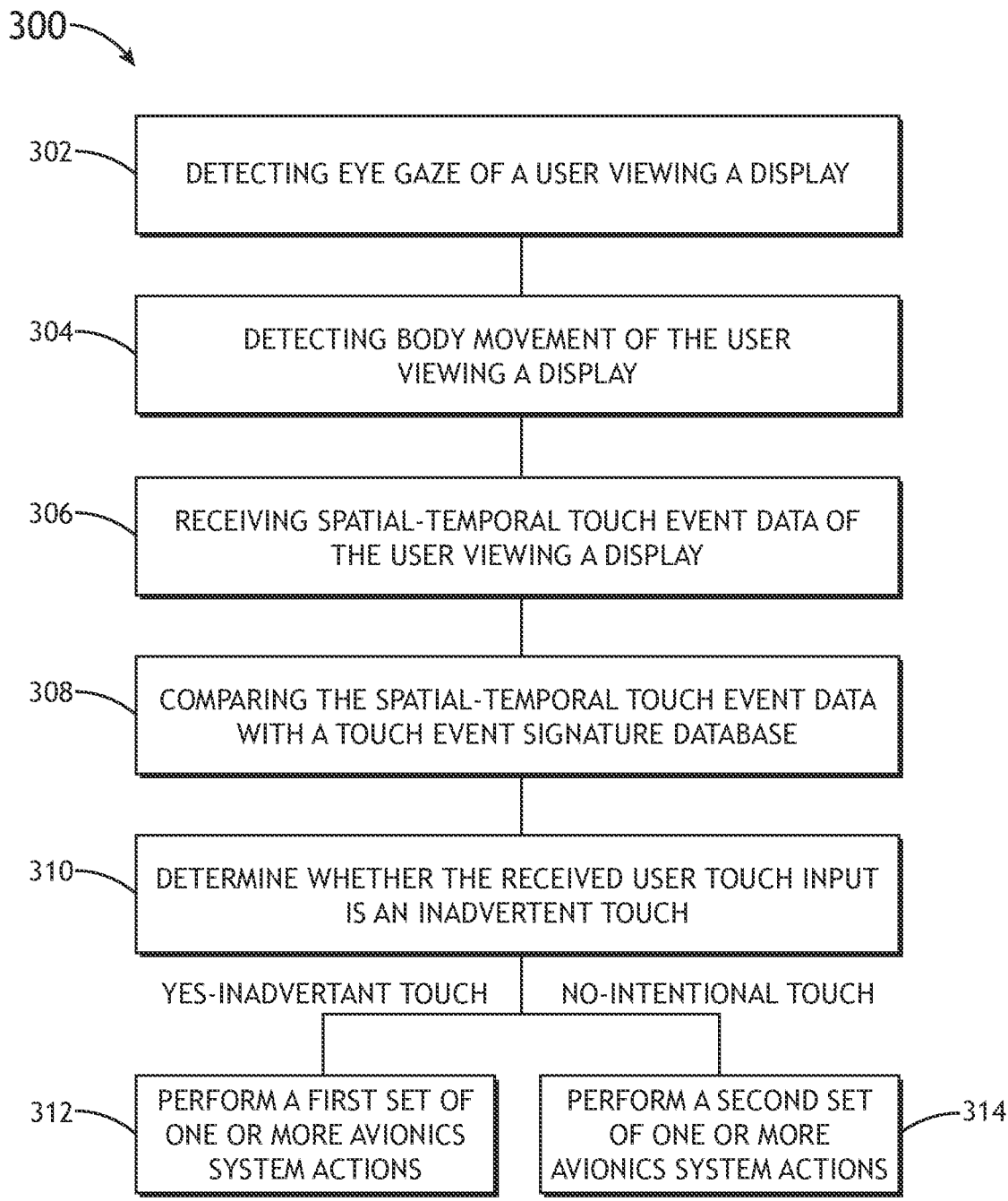
FIG. 3 illustrates a flowchart depicting a method or process for monitoring touch events in a cockpit display, in accordance with one or more embodiments of the disclosure.

FIG. 3 illustrates a flow diagram depicting a method or process 300 of monitoring touch events, in accordance with one or more embodiments of the present disclosure. In a step 302, the eye gaze of a user viewing a display may be detected. In a step 304, the body movement of a user viewing a display may be detected. In a step 306, spatial-temporal touch event data of a user viewing a display may be detected. In a step 308, the spatial-temporal touch event data may be compared to data within a touch event signature database. In a step 310, inadvertent touches may be determined. Upon determination of an inadvertent touch, in a step 312, a first set of one or more avionics system actions may be performed. Upon determination of an intentional touch, in a step 314, a second set of one or more avionics system actions may be performed.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to, one or more of the steps disclosed herein.

Although one or more embodiments of the present disclosure are directed to a touch event monitoring system for an aircraft cockpit, it is noted herein that the system and method may be directed for monitoring a touch event for any type of vehicle operator environment.

It is noted herein that the one or more components of system 101 may be communicatively coupled to the various other components of system 101 in any manner known in the art. For example, the one or more processors 104 may be communicatively coupled to each other and other components via a wireline (e.g., copper wire, fiber optic cable, and the like) or wireless connection (e.g., RF coupling, IR coupling, WiMax, Bluetooth, 3G, 4G, 4G LTE, 5G, and the like). By way of another example, the controller 102 may be communicatively coupled to one or more components of the system 100 via any wireline or wireless connection known in the art.

The one or more processors 104 may include any one or more processing elements known in the art. In this sense, the one or more processors 104 may include any microprocessor device configured to execute algorithms and/or program instructions. In general, the term "processor" may be broadly defined to encompass any device having one or more processing elements, which execute a set of program instructions from a non-transitory memory medium (e.g., the memory 106), where the one or more sets of program instructions are configured to cause the one or more processors 104 to carry out any of one or more process steps.

The memory 106 may include any storage medium known in the art suitable for storing the one or more sets of program instructions executable by the associated one or more processors 104. For example, the memory 106 may include a non-transitory memory medium. For instance, the memory 106 may include, but is not limited to, a read-only memory (ROM), a random access memory (RAM), a magnetic or optical memory device (e.g., disk), a magnetic tape, a solid state drive, and the like. The memory 106 may be configured to provide display information to the user device. In addition, the memory 106 may be configured to store user input information from one or more user input devices. The memory 106 may be housed in a common controller housing with the one or more processors 104. The memory 106 may, alternatively or in addition, be located remotely with respect to the spatial location of the processors 104 and/or the one or more controllers 102. For instance, the one or more processors 104, the one or more controllers 102 may access a remote database, accessible through a network (e.g., internet, intranet, and the like) via one or more communication interfaces.

The one or more communication interfaces may be operatively configured to communicate with one or more components of the one or more controllers 102 and/or the one or more components of the system. For example, the one or more communication interfaces may also be coupled (e.g., physically, electrically, and/or communicatively) with the one or more processors 104 to facilitate data transfer between components of the one or more components of the one or more controllers 102 and/or the one or more components of the system 101 and the one or more processors 104. For instance, the one or more communication interfaces may be configured to retrieve data from the one or more processors 104, or other devices, transmit data for storage in the memory 106, retrieve data from storage in the memory 106, or the like.

Although inventive concepts have been described with reference to the embodiments illustrated in the attached drawing figures, equivalents may be employed, and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A system, the system comprising:
one or more user interface devices including a display and a user input device, the user input device including a touchscreen interface configured to receive a user touch input from a user, the display including one or more display touch sensors configured to detect spatial-temporal touch event data associated with the user touch input received;
one or more user monitoring devices, the one or more user monitoring devices including one or more eye tracking sensors configured to detect an eye gaze of the user viewing the display, the one or more user monitoring devices including one or more body tracking sensors configured to detect body movement of the user viewing the display; and
one or more controllers communicatively coupled to the one or more user monitoring devices and the one or more user interface devices, the one or more controllers including one or more processors configured to execute a set of program instructions stored in memory, the memory including a touch event algorithm configured to detect an inadvertent touch event after the spatial-temporal touch event data is detected by the one or more display touch sensors, the set of program instructions configured to cause the one or more processors to:
receive eye gaze data of the user viewing the display from the one or more eye tracking sensors;
receive body movement data of the user viewing the display from the one or more body tracking sensors;
receive the spatial-temporal touch event data of the user viewing the display from the one or more display touch sensors of the display;
compare the spatial-temporal touch event data with touch event signature data in a touch event signature database;
determine, after the spatial-temporal touch event data is detected by the one or more display touch sensors, whether the received user touch input is the inadvertent touch event based on the compared spatial-temporal touch event data and at least one of the eye gaze data or the body movement data;
upon determining the received user touch input is the inadvertent touch event, perform a first set of one or more avionic system actions; and
upon determining the received user touch input is an intentional touch event, perform a second set of one or more avionic system actions,
wherein the second set of one or more avionic system actions are different than the first set of one or more avionic system actions.

2. The system of claim 1, wherein the first set of one or more avionic system actions comprise:
ignoring the user touch input by not providing the received user touch input to an avionics system.

3. The system of claim 1, wherein the first set of one or more avionic system actions comprise:
generating one or more control signals configured to cause the display to display an on-screen pop-up, wherein the on-screen pop-up allows the user to confirm whether the user touch input is the inadvertent touch event.

4. The system of claim 1, wherein the second set of one or more avionic system actions comprise:
providing the received user touch input to one or more avionic systems.

5. The system of claim 1, wherein the set of program instructions are further configured to cause the one or more processors to:
adjust one or more selectable buttons on a graphical user interface of the display.

6. The system of claim 5, wherein upon determining the received user touch input is the inadvertent touch event, decrease a size of the one or more selectable buttons on the graphical user interface of the display.

7. The system of claim 5, wherein upon determining the received user touch input is an inadvertent touch event, decrease a brightness of the one or more selectable buttons on the graphical user interface of the display.

8. The system of claim 5, wherein upon determining the received user touch input is an inadvertent touch event, hide the one or more selectable buttons on the graphical user interface of the display.

9. The system of claim 5, wherein upon determining the received user touch input is an intentional touch event, increase a size of the one or more selectable buttons on the graphical user interface of the display.

10. The system of claim 5, wherein upon determining the received user touch input is an intentional touch event, increase a brightness of the one or more selectable buttons on the graphical user interface of the display.

11. The system of claim 1, wherein the one or more eye tracking sensors includes one or more eye tracking cameras.

12. The system of claim 1, wherein the one or more body tracking sensors includes one or more body tracking cameras.

13. The system of claim 1, wherein the one or more eye tracking sensors and the one or more body tracking sensors are integrated into a common interface.

14. The system of claim 1, wherein the one or more eye tracking sensors and the one or more body tracking sensors are separated.

15. A method, the method comprising:
receiving one or more inputs from a user via a touchscreen interface of one or more user interface devices, the one or more user interface devices including a display;
detecting an eye gaze of the user viewing the display using one or more eye tracking sensors;
detecting body movement of the user viewing the display using one or more body tracking sensors;
receiving spatial-temporal touch event data of the user viewing the display from one or more display touch sensors;
comparing the spatial-temporal touch event data with touch event signature data in a touch event signature database;
determining, after the spatial-temporal touch event data is received from the one or more display touch sensors, whether the received user touch input is an inadvertent touch event based on the compared spatial-temporal touch event data and at least one of detected eye gaze data from the one or more eye tracking sensors or detected body movement data from the one or more body tracking sensors;

upon determining the received user touch input is the inadvertent touch event, performing a first set of one or more avionic system actions; and upon determining the received user touch input is an intentional touch event, performing a second set of one or more avionic system actions, wherein the second set of one or more avionic system actions are different than the first set of one or more avionic system actions.

16. The method of claim 15, wherein the first set of one or more avionic system actions comprise:
ignoring the user touch input by not providing the received user touch input to an avionics system.

17. The method of claim 15, wherein the first set of one or more avionic system actions comprise:
generating one or more control signals configured to cause the display to display an on-screen pop-up, wherein the on-screen pop-up allows the user to confirm whether the received user touch input is the inadvertent touch event.

18. The method of claim 15, wherein the first set of one or more avionic system actions comprise:
providing the received user touch input to one or more avionic systems.

19. The method of claim 15, further comprising:
adjusting one or more selectable buttons on a graphical user interface of the display.

* * * * *